US012366409B2

(12) United States Patent
Iida

(10) Patent No.: US 12,366,409 B2
(45) Date of Patent: Jul. 22, 2025

(54) STEEL-STRIP PRODUCTION METHOD, AND STEEL STRIP

(71) Applicant: JFE STEEL CORPORATION, Tokyo (JP)

(72) Inventor: Sachihiro Iida, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 1460 days.

(21) Appl. No.: 15/500,699

(22) PCT Filed: Aug. 7, 2015

(86) PCT No.: PCT/JP2015/072473
§ 371 (c)(1),
(2) Date: Jan. 31, 2017

(87) PCT Pub. No.: WO2016/024536
PCT Pub. Date: Feb. 18, 2016

(65) Prior Publication Data
US 2017/0219288 A1 Aug. 3, 2017

(30) Foreign Application Priority Data
Aug. 11, 2014 (JP) ................................ 2014-163562

(51) Int. Cl.
*F27B 9/30* (2006.01)
*B05C 3/02* (2006.01)
(Continued)

(52) U.S. Cl.
CPC .................. *F27B 9/30* (2013.01); *B05C 3/02* (2013.01); *B05C 3/125* (2013.01); *B05C 3/132* (2013.01);
(Continued)

(58) Field of Classification Search
None
See application file for complete search history.

(56) References Cited

U.S. PATENT DOCUMENTS 4,049,372 A * 9/1977 Bloom .................. C21D 9/563 198/782
6,341,955 B1 * 1/2002 Ueno .................... C21D 9/563 277/413
(Continued)

FOREIGN PATENT DOCUMENTS

CN 101993997 A 3/2011
CN 201915140 U 8/2011
(Continued)

OTHER PUBLICATIONS

JP H01142068 A English machine translation (Year: 1989).*
(Continued)

*Primary Examiner* — Keith Walker
*Assistant Examiner* — Catherine P Smith
(74) *Attorney, Agent, or Firm* — Oliff PLC

(57) ABSTRACT

A steel-strip production method for producing a hot-dip-plated steel strip and a cold-rolled steel strip, the method being executed by a production apparatus including a continuous annealing furnace, a snout connected to the continuous annealing furnace, a contact-type seal plate device, a noncontact-type seal roll device, a hot-dip-plating tank being movable; and a roll configured to turn the path direction of the steel strip after passing through the snout, wherein a hot-dip-plated steel strip production unit configured to produce the hot-dip-plated steel strip by bringing the steel strip continuously annealed in the continuous annealing furnace into the hot-dip-plating tank; and a cold-rolled steel strip production unit configured to produce the cold-rolled steel strip by transferring the steel strip continuously annealed in the continuous annealing furnace without caus-
(Continued)

ing the steel strip to pass through the hot-dip-galvanizing tank, are configured to be switchable with one another.

15 Claims, 7 Drawing Sheets

(51) Int. Cl.

| | |
|---|---|
| ***B05C 3/12*** | (2006.01) |
| ***B05C 3/132*** | (2006.01) |
| ***C21D 8/02*** | (2006.01) |
| ***C21D 9/56*** | (2006.01) |
| ***F27B 9/36*** | (2006.01) |

(52) U.S. Cl.
CPC ............. *C21D 8/0278* (2013.01); *C21D 9/56* (2013.01); *C21D 9/565* (2013.01); *F27B 9/36* (2013.01)

(56) References Cited

U.S. PATENT DOCUMENTS

| | | | |
|---|---|---|---|
| 8,714,104 | B2 | 5/2014 | Hoshino |
| 2012/0180721 | A1 | 7/2012 | Hoshino |

FOREIGN PATENT DOCUMENTS

| | | | | |
|---|---|---|---|---|
| CN | 102656286 | A | | 9/2012 |
| JP | S53-132437 | A | | 11/1978 |
| JP | S62-127427 | A | | 6/1987 |
| JP | S63-93829 | A | | 4/1988 |
| JP | 01142068 | A | * | 6/1989 |
| JP | H01-147048 | A | | 6/1989 |
| JP | H05-009592 | A | | 1/1993 |
| JP | H07-118820 | A | | 5/1995 |
| JP | H08-10819 | A | | 1/1996 |
| JP | 2590152 | B2 | | 3/1997 |
| JP | H11-279731 | A | | 10/1999 |
| JP | H11-286762 | A | | 10/1999 |
| JP | 2002-088414 | A | | 3/2002 |
| JP | 2002-275546 | A | | 9/2002 |
| JP | 2003-247025 | A | | 9/2003 |
| JP | 2004-099953 | A | | 4/2004 |
| JP | 2008-024981 | A | | 2/2008 |
| JP | 2010-215990 | A | | 9/2010 |

OTHER PUBLICATIONS

Dec. 1, 2017 Search Report issued in European Patent Application No. 15831909.5.
Dec. 4, 2017 Office Action issued in Chinese Patent Application No. 201580042820.X.
Mar. 28, 2017 Office Action issued in Japanese Patent Application No. 2014-163562.
Sep. 12, 2017 Office Action issued in Japanese Patent Application No. 2014-163562.
Nov. 10, 2015 International Search Report issued in International Patent Application No. PCT/JP2015/072473.
Apr. 3, 2018 Office Action issued in Japanese Patent Application No. 2014-163562.
Dec. 30, 2022 Office Action issued in Chinese Patent Application No. 202111240182.6.
Jul. 19, 2018 Office Action issued in Korean Patent Application No. 1020177003116.
Oct. 9, 2024 Office Action issued in Chinese Application No. 202111240182.6.

* cited by examiner

STEEL-STRIP PRODUCTION METHOD, AND STEEL STRIP

FIELD

The present invention relates to a steel-strip production method.

BACKGROUND

In recent years, there has been proposed a production apparatus that produces a hot-dip-plated steel strip and a cold-rolled steel strip using the same equipment. To be more specific, Patent Literature 1 describes a production apparatus provided with a continuous annealing furnace, hot dip plating equipment, and a bypass furnace that transfers a steel strip from the continuous annealing furnace to water quenching equipment without causing the steel strip to pass through the hot dip plating equipment. In the production apparatus, when producing the hot-dip-plated steel strip, the steel strip is transferred from the continuous annealing furnace to the hot dip plating equipment, and when producing the cold-rolled steel strip, the steel strip is transferred from the continuous annealing furnace to the water quenching equipment by way of the bypass furnace.

CITATION LIST

Patent Literature

Patent Literature 1: Japanese Laid-open Patent Publication No. 2002-88414

SUMMARY

Technical Problem

However, the production apparatus described in Patent Literature 1 is provided with bypass furnace in order to switch a steel strip to be produced between the hot-dip-plated steel strip and the cold-rolled steel strip and hence, it is necessary to use a large-scale production apparatus, and it is difficult to design the production apparatus. Furthermore, since a path of the steel strip is changed when switching the steel strip to be produced, cutting and welding operations of the steel strip, and opening and closing operations of the continuous annealing furnace require considerable amount of efforts and times.

In general, in order to prevent oxidation of a steel sheet in the continuous annealing furnace, it is necessary to prevent an atmospheric air from being mixed into an atmospheric gas in the inside of the continuous annealing furnace when switching the steel strip to be produced. Furthermore, when the atmospheric air enters into the continuous annealing furnace, the oxygen or the like contained in the atmospheric air is required to be removed and hence, it is necessary to exchange the atmospheric gas in the continuous annealing furnace. However, in Patent Literature 1, a measure to prevent the atmospheric air from entering into the continuous annealing furnace when switching the steel strip to be produced is not disclosed or suggested. In addition, in the production apparatus described in Patent Literature 1, the transfer path of the steel strip in producing the hot-dip-plated steel strip and the transfer path of the steel strip in producing the cold-rolled steel strip are different from each other and hence, it is necessary to change a program that controls transfer processes of the steel strip each time when switching the steel strip to be produced.

As described above, according to the production apparatus described in Patent Literature 1, it is difficult to produce the hot-dip-plated steel strip and the cold-rolled steel strip using the same equipment without taking considerable amount of efforts and times, while preventing the atmospheric gas in the continuous annealing furnace from flowing to the outside of the furnace and preventing the atmospheric air from entering into the furnace.

The present invention has been made to overcome such problems, and it is an object of the present invention to provide a steel-strip production method, the method being capable of switching between the producing of the hot-dip-plated steel strip and the producing of the cold-rolled steel strip without taking considerable amount of efforts and times, and producing the steel strip with substantially the same transfer path and transfer length irrespective of the type of the steel strip, while preventing the atmospheric gas in the continuous annealing furnace from flowing to the outside of the furnace and preventing the atmospheric air from entering into the furnace.

Solution to Problem

To solve the problem and achieve the object, a steel-strip production method according to the present invention is a method of producing a hot-dip-plated steel strip and a cold-rolled steel strip, the method being executed by a production apparatus including: a continuous annealing furnace; a snout connected to the continuous annealing furnace; a contact-type seal plate device and a noncontact-type seal roll device that are arranged on the entry side of the snout along the transfer direction of the steel strip in this order; a hot-dip-plating tank being movable; and a roll configured to turn the path direction of the steel strip after passing through the snout, wherein a hot-dip-plated steel strip production unit configured to produce the hot-dip-plated steel strip by bringing the steel strip continuously annealed in the continuous annealing furnace into the hot-dip-plating tank, and a cold-rolled steel strip production unit configured to produce the cold-rolled steel strip by transferring the steel strip continuously annealed in the continuous annealing furnace without causing the steel strip to pass through the hot-dip-plating tank are configured to be switchable with one another.

Moreover, in the steel-strip production method according to the present invention, when producing the hot-dip-plated steel strip, opening the seal plate device and the seal roll device; and when producing the cold-rolled steel strip, opening the seal plate device and closing the seal roll device.

Moreover, in the steel-strip production method according to the present invention, a sink roll which is the roll configured to turn the path direction of the steel strip when producing the hot-dip-plated steel strip, and a deflector roll which is the roll configured to turn the path direction of the steel strip when producing the cold-rolled steel strip are configured to switch in accordance with the type of the steel strip to be produced.

Moreover, in the steel-strip production method according to the present invention, when switching from the producing of the hot-dip-plated steel strip to the producing of the cold-rolled steel strip: stopping the transfer of the steel strip; closing the seal plate device; removing an in-tank immersion sink roll and bath equipment, moving the hot-dip-plating tank from an online position to an off-line position; installing the deflector roll at the arrangement position of the in-tank immersion sink roll to form the transfer path when producing the cold-rolled steel strip; closing the seal roll device; and opening the seal plate device, and when switching from the producing of the cold-rolled steel strip to the producing of the hot-dip-plated steel strip: stopping the transfer of the steel strip; closing the seal plate; removing the deflector roll; moving the hot-dip-plating tank from the off-line position to the online position; installing the in-tank immersion sink roll and the bath equipment; and opening the seal plate device.

Moreover, a steel-strip according to the present invention includes the steel-strip produced using the steel-strip production method according to the present invention.

Advantageous Effects of Invention

The steel-strip production method according to the present invention is capable of switching between the producing of the hot-dip-plated steel strip and the producing of the cold-rolled steel strip without taking considerable amount of efforts and times, and producing the steel strip with substantially the same transfer path and transfer length irrespective of the type of the steel strip, while preventing the atmospheric gas in the continuous annealing furnace from flowing to the outside of the furnace and preventing the atmospheric air from entering into the furnace.

DESCRIPTION OF EMBODIMENTS

Hereinafter, with reference to drawings, a steel-strip production method according to one embodiment of the present invention is specifically explained by taking a case where a hot-dip galvanized steel strip and a cold-rolled steel strip are produced, as an example.

Constitution of Production Apparatus

Figure 1:
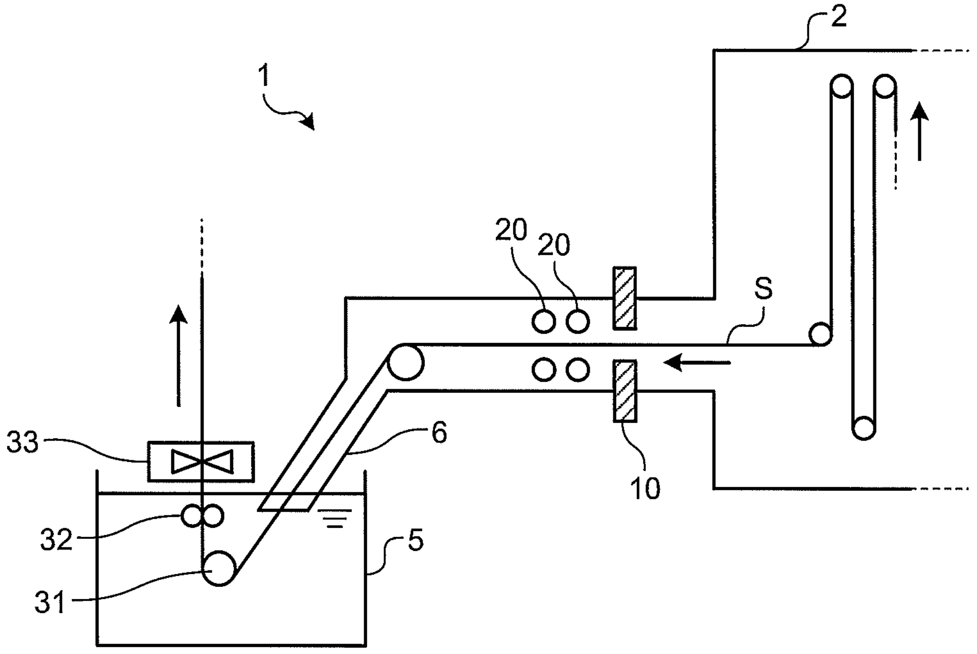
FIG. 1 is a schematic view illustrating a constitution of a production apparatus of a steel strip according to one embodiment of the present invention.
Figure 2:
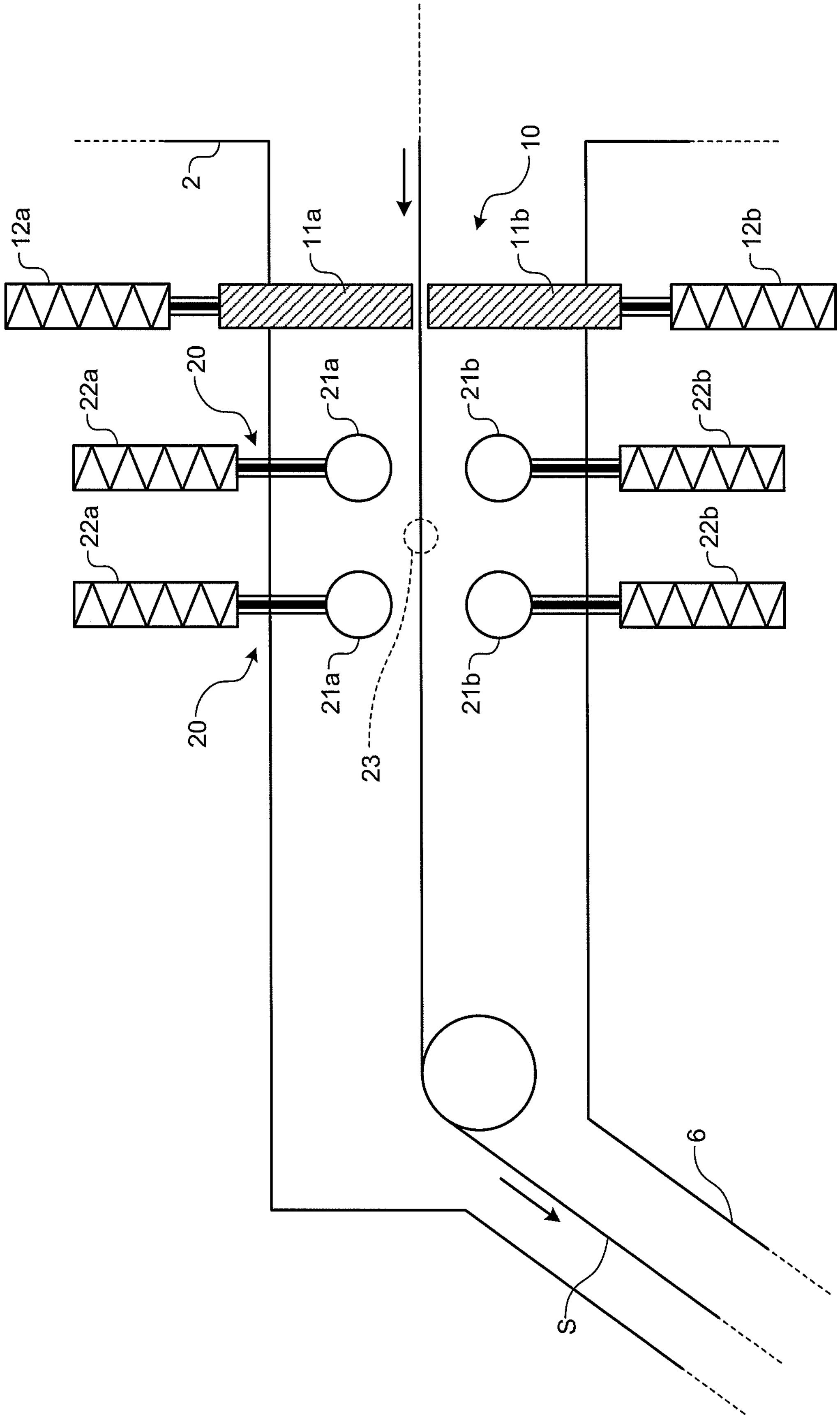
FIG. 2 is a schematic view illustrating the constitution of the production apparatus of the steel strip on the exit side of a continuous annealing furnace illustrated in FIG. 1.
Figure 3:
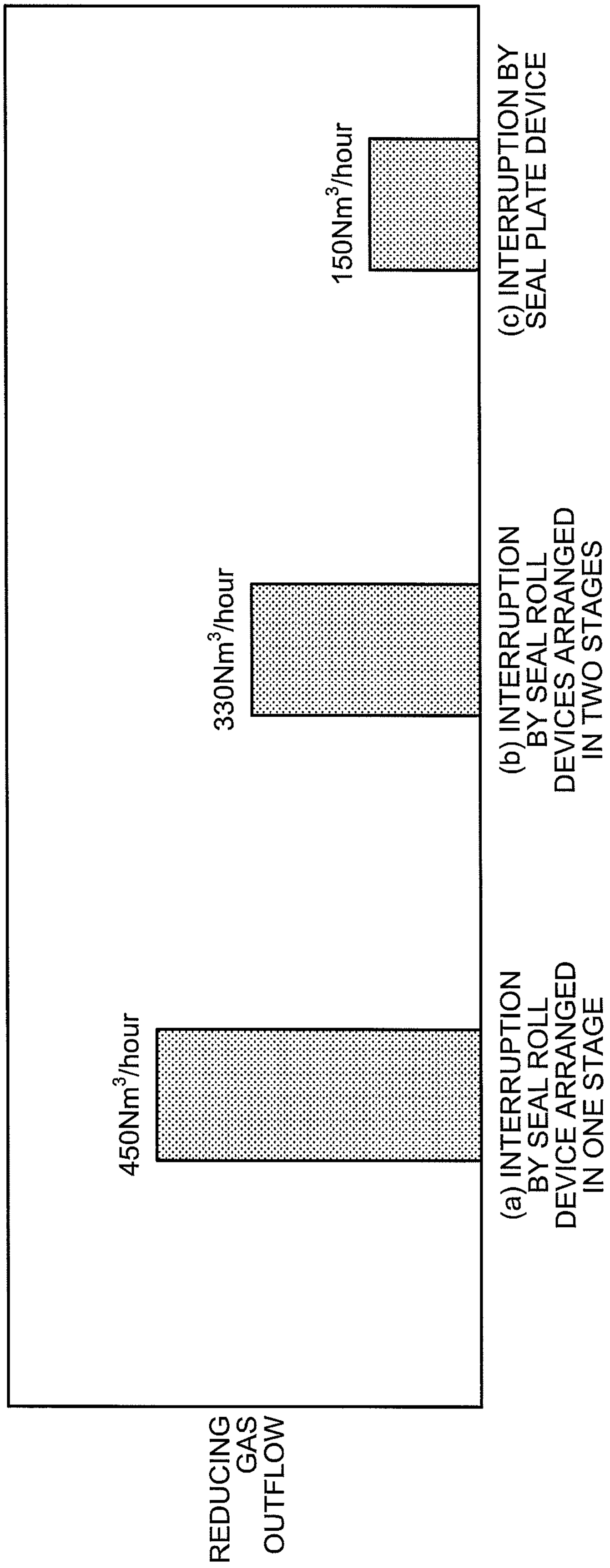
FIG. 3 is a view illustrating one example of an outflow of a reducing gas in the continuous annealing furnace from a sealed part of the furnace when a seal roll device(s) and a seal plate device are installed.

First of all, with reference to FIG. 1 to FIG. 3, the explanation is made with respect to the constitution of a production apparatus according to one embodiment of the present invention used for producing the steel strip.

FIG. 1 is a schematic view illustrating a constitution of the production apparatus according to one embodiment of the present invention used for producing the steel strip. FIG. 2 is a schematic view illustrating the constitution of the production apparatus of the steel strip on the exit side of a continuous annealing furnace illustrated in FIG. 1. FIG. 3 is a view illustrating one example of an outflow of a reducing gas in the continuous annealing furnace from a sealed part of the furnace when a seal roll device(s) and a seal plate device are installed.

As illustrated in FIG. 1, a production apparatus 1 of a steel strip according to one embodiment of the present invention is provided with a continuous annealing furnace 2, a snout 6, sealing devices 10 and 20 arranged on the entry side of the snout, a hot-dip-galvanizing tank 5, and bath equipment (an in-tank immersion sink roll 31, an in-tank support roll 32, a plated coating weight control device 33, and the like), as main constitutional features. Here, the entry side of the snout includes a portion in which the snout 6 and the continuous annealing furnace 2 are connected with each other.

As the reducing gas in the continuous annealing furnace 2, in order to prevent oxidation of the surfaces of the steel strip in annealing, a mixed gas of hydrogen and nitrogen having general hydrogen concentration of several percent by volume to several tens of percent by volume can be exemplified. Conditions, such as a hydrogen concentration and the amount of supply of the reducing gas, are properly set.

The hot-dip-galvanizing tank 5 having a hot-dip-galvanizing bath in the inside thereof is configured to be movable between an online position at which hot dip galvanizing is applied to a steel strip S and an off-line position to which the hot-dip-galvanizing tank 5 is retracted when the hot dip galvanizing is not applied to the steel strip S. As a movement mechanism of the hot-dip-galvanizing tank 5, a movement mechanism using a screw jack and a carriage can be exemplified. In producing a hot-dip-plated steel strip, the steel strip S is, after passing through the snout 6, brought into the hot-dip-galvanizing tank 5, and pulled up from the hot-dip-galvanizing bath. Thereafter, galvanized coating weight is adjusted by the plated coating weight control devices, such as a gas wiping device.

After a galvanized coating is formed, the steel strip S is cooled, or alloying treatment may be applied to the steel strip S. The alloying treatment is processing that reheats the steel strip S to a predetermined temperature by using an alloying furnace, such as an induction heating furnace and the like (not illustrated in the drawings), thus alloying the galvanized film adhered to the steel strip S.

As illustrated in FIG. 2, a seal plate device 10 and seal roll devices 20 arranged in two stages are arranged along the transfer direction of the steel strip S in this order between the exit side of the continuous annealing furnace 2 and the snout 6.

The seal plate device 10 is a contact-type device in which a pair of seal plates 11*a* and 11*b* that face each other are brought into contact with the steel strip S during usual short-time line stop or when operation troubles force line stop thus preventing the atmospheric gas (reducing gas) in the continuous annealing furnace 2 from flowing to the outside of the furnace, and preventing the atmospheric air from entering into the furnace. A distance between the seal plate 11*a* and the seal plate 11*b* is controlled by opening/closing devices 12*a* and 12*b*.

The seal roll device 20 is a noncontact-type device in which a pair of seal rolls 21a and 21b are brought closer to the steel strip S as necessary without being brought into contact with the steel strip S thus preventing the reducing gas in the continuous annealing furnace 2 from flowing to the outside of the furnace and preventing the atmospheric air from entering into the furnace. Each of the seal roll device 20 is capable of being independently controlled for each stage. A distance between the seal roll 21*a* and the seal roll 21*b* is controlled by opening/closing devices 22*a* and 22*b*.

The seal plate device 10 and the seal roll devices 20 are arranged between the exit side of the continuous annealing furnace 2 and the entry side of the snout 6 thus preventing the reducing gas from flowing to the outside of the continuous annealing furnace 2 more effectively and preventing the atmospheric air from entering into the continuous annealing furnace 2 more effectively when switching between a hot-dip-plated steel strip producing route and a cold-rolled steel strip producing route and when producing a cold-rolled steel strip. Due to such constitution, it is possible to produce the hot-dip-plated steel strip or the cold-rolled steel strip without using complicated and large-scale equipment.

The seal plate device 10 is a contact-type device that prevents the reducing gas from flowing to the outside of the furnace during line stop thus reducing the outflow of the reducing gas to the outside of the furnace as compared with the seal roll devices 20. Here, it may be possible to further prevent the reducing gas from flowing to the outside of the furnace by also closing the seal roll devices 20 during line stop.

The seal roll devices 20 are arranged in two stages because as illustrated in FIG. 3, the seal roll devices 20 arranged in two stage further reduce the outflow of the reducing gas to the outside of the furnace compared with the case that the seal roll device 20 is arranged in one stage; and even when problems, such as foreign matter adhesion, occur in either one of the seal roll devices 20, it is possible to continue the operation by closing remaining seal roll device 20, while opening the seal roll device 20 in which the problems occur. It is undesirable to install the seal roll devices 20 arranged in three stages or more because of less advantageous effects considering the increase in cost of the production apparatus and the increase in space for installing the production apparatus.

The seal plate device 10 and the seal roll devices 20 arranged in two stages are installed along the transfer direction of the steel strip S in this order because the checking and cleaning of the seal roll devices 20 can be easily performed in a state that the reducing gas is prevented from flowing to the outside of the furnace by using the seal plate device 10 during line stop. The checking and cleaning of the seal roll devices 20 are performed to reduce the occurrence of product defects attributed to the seal roll devices 20. Furthermore, since the seal plate device 10 prevents the reducing gas from flowing to the outside of the furnace during line stop, the seal roll devices 20 can be opened in checking the seal roll devices 20. As a result, the checking and cleaning of the seal roll devices 20 become very easy.

In a furnace wall in the vicinity of the position where the seal roll devices 20 are arranged, an inspection window 23 is arranged so that the seal roll devices 20 can be visually checked. Due to such constitution, the seal roll devices 20 can be easily checked by way of the inspection window 23. Furthermore, in at least one space out of a space between the seal plate device 10 and the seal roll devices 20 arranged in two stages, and a space between the seal roll devices 20 arranged in two stages and the snout 6, it is desirable to form a working space having a height of 1.5 m or more in the furnace. Because such working space is formed, a worker can safely enter into the working space through the furnace wall in a safe state that the reducing gas hardly flows to the outside of the furnace through the seal plate device 10 during line stop, and can easily perform the checking and cleaning of the seal roll devices 20 in the working space.

By using the production apparatus of the steel strip having the above-described constitution, a hot-dip galvanized steel strip or a cold-rolled steel strip is produced by the following method, in the present invention. Hereinafter, with reference to FIGS. 4A to 4D and FIGS. 5A to 5D, a steel-strip production method is explained for each of the case of switching from the producing of a hot-dip galvanized steel strip to the producing of a cold-rolled steel strip, and the case of switching from the producing of the cold-rolled steel strip to the producing of the hot-dip galvanized steel strip.

Method for Producing Cold-Rolled Steel Strip

First of all, the explanation is made with respect to the steel-strip production method in the case of switching from the producing of the hot-dip galvanized steel strip to the producing of the cold-rolled steel strip.

Figure 4A:
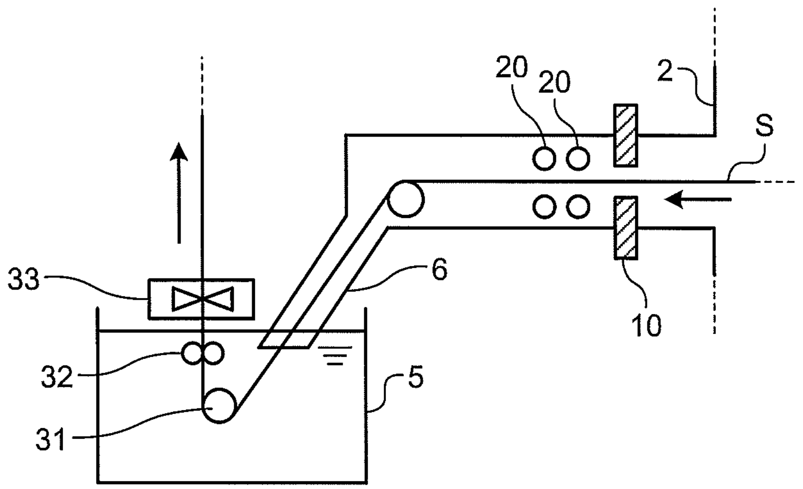
FIG. 4A is a schematic view illustrating the operation of the production apparatus when switching from the producing of the hot-dip galvanized steel strip to the producing of the cold-rolled steel strip.
Figure 4B:
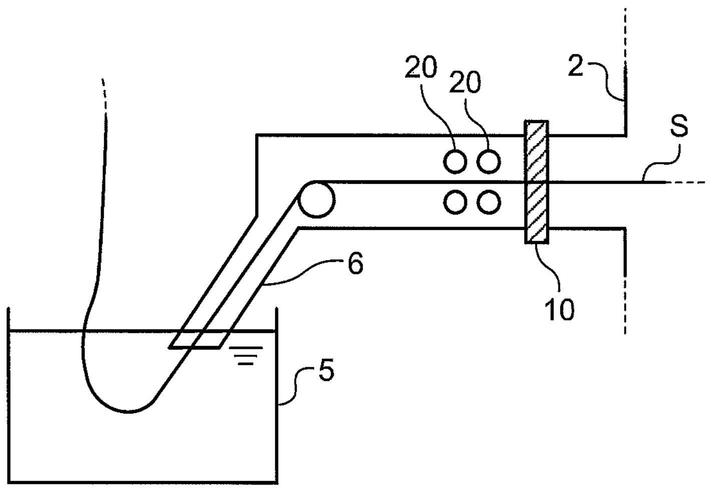
FIG. 4B is a schematic view illustrating the operation of the production apparatus when switching from the producing of the hot-dip galvanized steel strip to the producing of the cold-rolled steel strip.

FIG. 4A to FIG. 4D are schematic views each illustrating the operation of the production apparatus. FIG. 4A is a view illustrating a state where the hot-dip galvanized steel strip is produced. When switching from the state above to a state of producing of a cold-rolled steel strip, at first, after the transfer of the steel strip S is stopped, as illustrated in FIG. 4B, the seal plate device 10 is closed thus stopping the reducing gas in the continuous annealing furnace 2 from flowing to the outside of the furnace. Furthermore, bath equipment including the in-tank immersion sink roll 31, the in-tank support roll 32, the plated coating weight control device 33, and the like that are illustrated in FIG. 4A is removed.

Figure 4C:
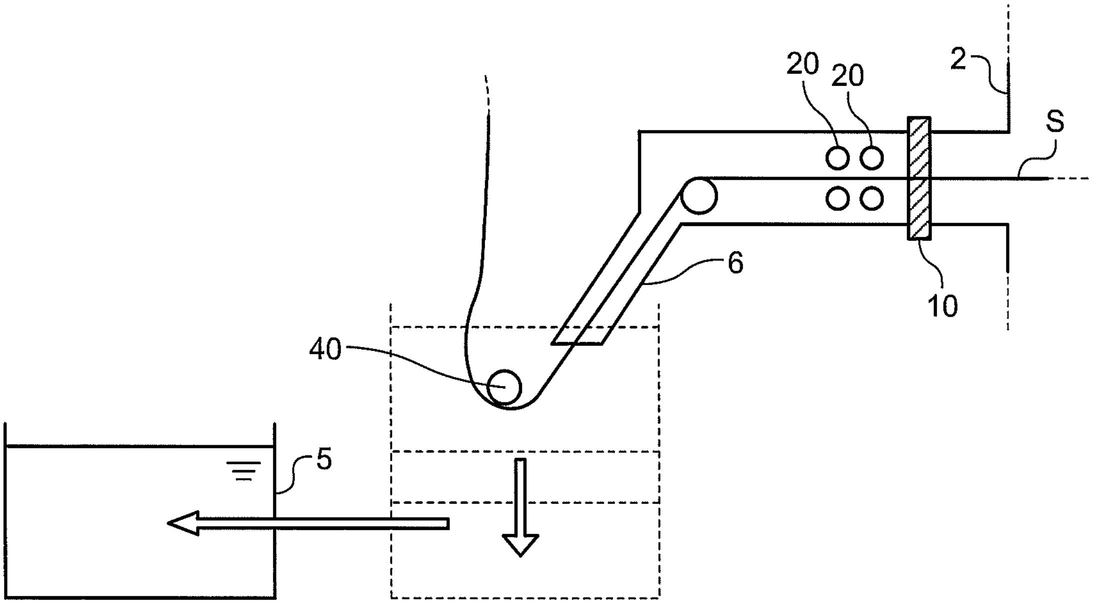
FIG. 4C is a schematic view illustrating the operation of the production apparatus when switching from the producing of the hot-dip galvanized steel strip to the producing of the cold-rolled steel strip.

Next, as illustrated in FIG. 4C, hot-dip-galvanizing tank 5 is moved from the online position to the off-line position. Thereafter, a deflector roll 40 is installed at the position of the in-tank immersion sink roll 31 to form the transfer path of the steel strip S for producing the cold-rolled steel strip. The transfer direction of the steel strip S after passing through the snout 6 is turned by the deflector roll 40.

Figure 4D:
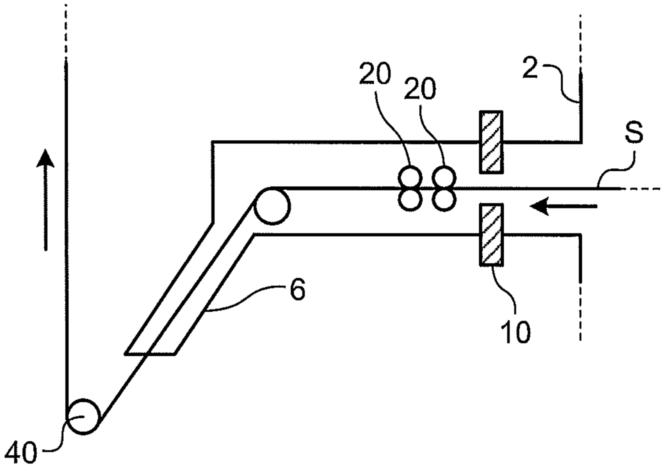
FIG. 4D is a schematic view illustrating the operation of the production apparatus when switching from the producing of the hot-dip galvanized steel strip to the producing of the cold-rolled steel strip.

Lastly, as illustrated in FIG. 4D, the seal plate device 10 is opened after closing the seal roll devices 20 thus preventing the reducing gas from flowing to the outside of the furnace and preventing the atmospheric air from entering into the furnace, using the seal roll devices 20. Thereafter, the transfer of the steel strip S is started, and the cold-rolled steel strip is produced.

The transfer direction of the steel strip S is turned by the deflector roll 40 arranged at the position of the in-tank immersion sink roll 31 thus producing the cold-rolled steel strip with substantially the same transfer path and transfer length as in the case of the hot-dip galvanized steel strip. Furthermore, substantially the same location tracking calculation processing of the steel strip S can be used irrespective of the steel strip S to be produced and hence, only one location tracking program is required in a computer and program change processing becomes unnecessary, and therefore a system is simplified.

Furthermore, the same transfer path of the steel strip S can be used and hence, a function and operation for tilting the snout 6 also become unnecessary thus reducing the cost of equipment. In addition, the opening and closing operations or the like of the continuous annealing furnace 2 become unnecessary and hence, the efforts and times required for switching between the opening and the closing of the continuous annealing furnace 2 can be reduced thus improving production efficiency.

Method for Producing Hot-Dip Galvanized Steel Strip

Next, the explanation is made with respect to the steel-strip production method in the case of switching from the producing of the cold-rolled steel strip to the producing of the hot-dip galvanized steel strip.

Figure 5A:
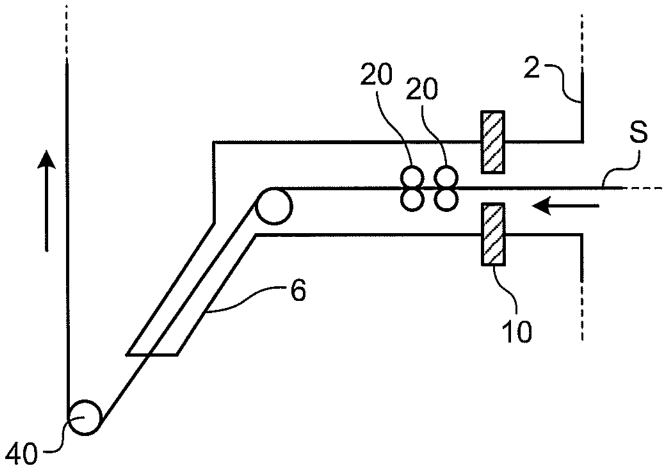
FIG. 5A is a schematic view illustrating the operation of the production apparatus when switching from the producing of the cold-rolled steel strip to the producing of the hot-dip galvanized steel strip.
Figure 5B:
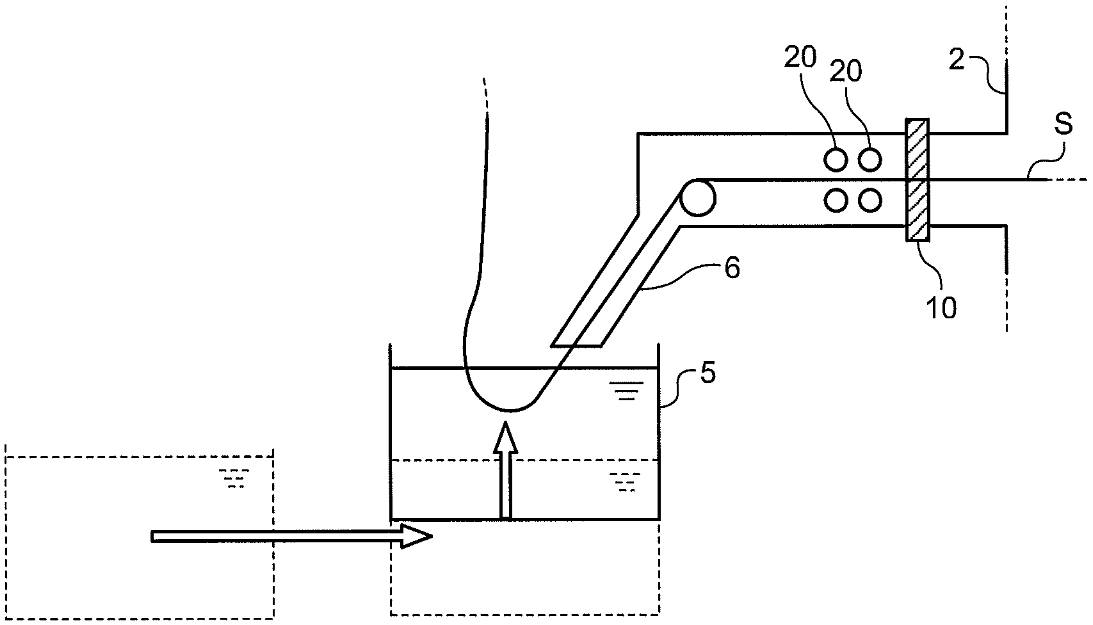
FIG. 5B is a schematic view illustrating the operation of the production apparatus when switching from the producing of the cold-rolled steel strip to the producing of the hot-dip galvanized steel strip.

FIG. 5A to FIG. 5D are schematic views each illustrating the operation of the production apparatus when switching from the producing of the cold-rolled steel strip to the producing of the hot-dip galvanized steel strip. FIG. 5A is a view illustrating a state where the cold-rolled steel strip is produced. When switching from the state above to a state of producing the hot-dip galvanized steel strip, at first, the transfer of the steel strip S is stopped and, as illustrated in FIG. 5B, the seal plate device 10 is thereafter closed and the seal roll devices 20 are opened thus preventing the reducing gas from flowing to the outside of the furnace and preventing the atmospheric air from entering into the furnace, using the seal plate device 10. Furthermore, the deflector roll 40 is removed, and the hot-dip-galvanizing tank 5 is moved from the off-line position to the online position.

Figure 5C:
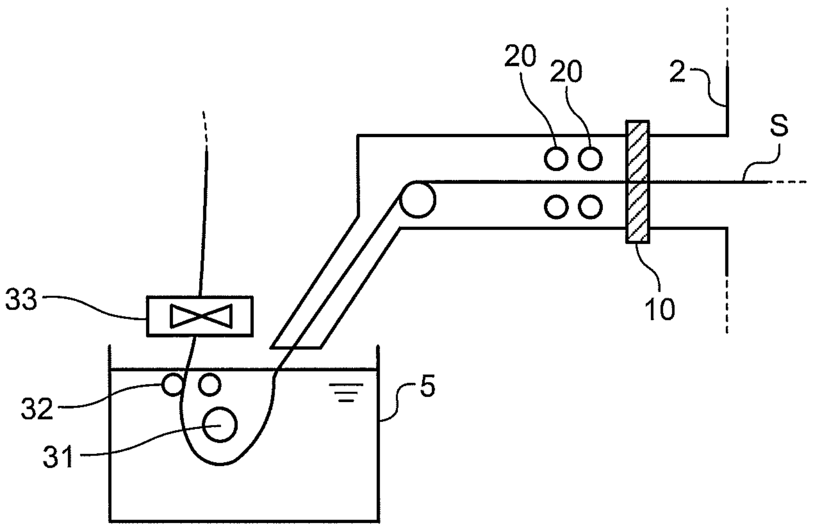
FIG. 5C is a schematic view illustrating the operation of the production apparatus when switching from the producing of the cold-rolled steel strip to the producing of the hot-dip galvanized steel strip.
Figure 5D:
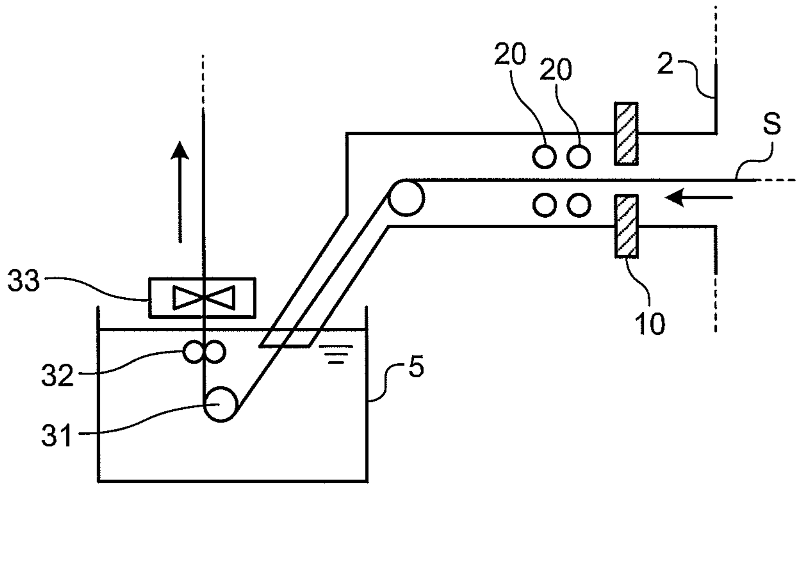
FIG. 5D is a schematic view illustrating the operation of the production apparatus when switching from the producing of the cold-rolled steel strip to the producing of the hot-dip galvanized steel strip.

Next, as illustrated in FIG. 5C, the bath equipment including the in-tank immersion sink roll 31, the in-tank support roll 32, the plated coating weight control device 33, and the like is installed. Lastly, as illustrated in FIG. 5D, after the immersion of the distal end of the snout 6 in the hot-dip-galvanizing bath of the hot-dip-galvanizing tank 5, the seal plate device 10 is opened. In this case, the snout 6 is hermetically closed thus preventing the reducing gas from flowing to the outside of the continuous annealing furnace and preventing the atmospheric air from entering into the furnace. Thereafter, the transfer of the steel strip S is started, and the hot-dip galvanized steel strip is produced.

The transfer direction of the steel strip S after passing through the snout 6 is turned by the in-tank immersion sink roll 31 arranged at the position of the deflector roll 40. As a result, the hot-dip galvanized steel strip can be produced with substantially the same transfer path and transfer length as in the case of the cold-rolled steel strip. Thus, just as in the case of the cold-rolled steel strip mentioned above, the system is simplified, the cost of equipment is reduced, and the production efficiency is improved.

As can be clearly understood from the explanation above, in the steel-strip production method according to one embodiment of the present invention, when producing the hot-dip-plated steel strip, the seal plate device 10 and the seal roll devices 20 are opened, the steel strip S is transferred, and the steel strip S after being continuously annealed is brought into the hot-dip-plating tank 5.

When switching from the producing of the hot-dip-plated steel strip to the producing of the cold-rolled steel strip, the seal plate device 10 is closed, the hot-dip-galvanizing tank 5, the in-tank immersion sink roll 31, the in-tank support roll 32, and the plated coating weight control device 33 are thereafter moved to the off-line position, the deflector roll 40 is installed at the position of the in-tank immersion sink roll 31, the seal roll devices 20 are thereafter closed, and the seal plate device 10 is opened thus switching to the producing of the cold-rolled sheet steel.

On the other hand, when switching from the producing of the cold-rolled steel strip to the producing of the hot-dip-plated steel strip, the seal plate device 10 is closed, the seal roll devices 20 are thereafter opened, the hot-dip-galvanizing tank 5, the in-tank immersion sink roll 31, the in-tank support roll 32, and the plated coating weight control device 33 are moved to the online position, the distal end of the snout 6 is immersed in the hot-dip-galvanizing bath of the hot-dip-galvanizing tank 5, and the seal plate device 10 is thereafter opened thus switching to the producing of the hot-dip galvanized steel strip.

Due to such constitution, the seal plate device 10 and the seal roll devices 20 can be used to prevent the reducing gas in the continuous annealing furnace 2 from flowing to the outside of the furnace and to prevent the atmospheric air from entering into the furnace. Furthermore, the in-tank immersion sink roll 31 and the deflector roll 40 are located at the same position and hence, the transfer direction of the steel strip S is turned at the same direction turning point irrespective of the type of the steel strip S thus the hot-dip galvanized steel strip and the cold-rolled steel strip can be produced with substantially the same transfer path and transfer length. As a result, the hot-dip galvanized steel strip and the cold-rolled steel strip can be produced without taking considerable amount of efforts and times, thus further simplifying the production apparatus and improving production efficiency.

Heretofore, although the embodiment to which the invention made by inventors is applied has been explained in conjunction with drawings, the present invention is not limited to the description and the drawings by way of the above-mentioned embodiment that merely constitutes one embodiment of the present invention. For example, with respect to plating, not only the hot dip galvanizing but also the aluminum plating, the composite plating of zinc and aluminum, or the like may be used. Furthermore, the steel grade of the cold-rolled steel strip is not limited in particular. In this manner, various modifications, embodiment examples, and techniques conceivable of by those skilled in the art or the like based on the present embodiment are arbitrarily conceivable without departing from the gist of the present invention.

INDUSTRIAL APPLICABILITY

According to the present invention, it is possible to provide a steel-strip production method, the method being capable of switching between the hot-dip-plated steel strip and the cold-rolled steel strip without taking considerable amount of efforts and times, while preventing the atmospheric gas in the continuous annealing furnace from flowing to the outside of the furnace and preventing the atmospheric air from entering into the furnace, and producing the steel strip with substantially the same transfer path and transfer length irrespective of the type of the steel strip.

REFERENCE SIGNS LIST

1 production apparatus of steel strip
2 continuous annealing furnace
5 hot-dip-galvanizing tank
6 snout
10 seal plate device
20 seal roll device
31 in-tank immersion sink roll
32 in-tank support roll
33 plated coating weight control device
40 deflector roll
S steel strip

The invention claimed is:

1. A steel-strip production method for producing a hot-dip-plated steel strip and a cold-rolled steel strip, the method comprising:

providing a steel-strip production apparatus configured to produce a hot-dip-plated steel strip and a cold-rolled steel strip from a base steel strip, the steel-strip production apparatus including a continuous annealing furnace, a snout connected to the continuous annealing furnace, a contact seal plate device and a noncontact seal roll device that are arranged on an entry side of the snout along a transfer direction of the base steel strip in this order, a removable hot-dip-plated steel strip device configured to produce the hot-dip-plated steel strip, and a removable cold-rolled steel strip device configured to produce the cold-rolled steel strip, the removable hot-dip-plated steel strip device including a hot-dip-plating tank, bath equipment disposed in the hot-dip-plating tank, and a sink roll that is configured to turn a path direction of the base steel strip after the base steel strip passes through the snout with the removable hot-dip-plated steel strip device in an online position, and the removable cold-rolled steel strip device including a deflector roll configured to turn the path direction of the base steel strip after the base steel strip passes through the snout with the removable cold-rolled steel strip device in an online position;

at least one of (i) continuously annealing a first portion of the base steel strip to produce the hot-dip-plated steel strip by moving the removable cold-rolled steel strip device from the online position to an offline position where the removable cold-rolled steel strip device is completely removed from the steel-strip production apparatus, and operating the steel-strip production apparatus with the removable hot-dip-plated steel strip device in the online position, and (ii) continuously annealing a second portion of the base steel strip to produce the cold-rolled steel strip by moving the removable hot-dip-plated steel strip device from the online position to an offline position where the removable hot-dip-plated steel strip device is completely removed from the steel-strip production apparatus, and operating the steel-strip production apparatus with the removable cold-rolled steel strip device in the online position, wherein during continuously annealing the first portion of the base steel strip with the removable hot-dip-plated steel strip device in the online position, the hot-dip-plated steel strip is produced from the first portion of the base steel strip by bringing the first portion of the base steel strip that is continuously annealed in the continuous annealing furnace into the hot-dip-plating tank, during continuously annealing the second portion of the base steel strip with the removable cold-rolled steel strip device in the online position, the cold-rolled steel strip is produced from the second portion of the base steel strip by transferring the base steel strip that is continuously annealed in the continuous annealing furnace without causing the second portion of the base steel strip to pass through the hot-dip-plating tank, and a position of the sink roll in the removable hot-dip-plated steel strip device when in the online position is a position of the deflector roll in the removable cold-rolled steel strip device when in the online position.

2. The steel-strip production method according to claim 1, wherein the production of the hot-dip-plated steel strip includes opening the contact seal plate device and the noncontact seal roll device, and the production of the cold-rolled steel strip includes opening the contact seal plate device and closing the noncontact seal roll device.

3. The steel-strip production method according to claim 1, wherein the step of moving the removable hot-dip-plated steel strip device from the online position to an offline position includes:

stopping the transfer of the base steel strip;
closing the contact seal plate device;
installing the removable cold-rolled steel strip device including the deflector roll to form a transfer path when producing the cold-rolled steel strip;
closing the noncontact seal roll device; and
opening the contact seal plate device, and the step of moving the removable cold-rolled steel strip device from the online position to an offline position includes:

stopping the transfer of the base steel strip;
closing the contact seal plate device;
installing the removable hot-dip-plated steel strip device including the bath equipment including the sink roll; and
opening the contact seal plate device.

4. A hot-dip-plated steel strip produced using the steel-strip production method according to claim 1.

5. The steel-strip production method according to claim 2, wherein the step of moving the removable hot-dip-plated steel strip device from the online position to an offline position includes:

stopping the transfer of the base steel strip;
closing the contact typecontact seal plate device;
installing the removable cold-rolled steel strip device including the deflector roll to form a transfer path when producing the cold-rolled steel strip;
closing the noncontact seal roll device; and
opening the contact seal plate device, and the step of moving the removable cold-rolled steel strip device from the online position to an offline position includes:

stopping the transfer of the base steel strip;
closing the contact seal plate device;
installing the removable hot-dip-plated steel strip device including the bath equipment including the sink roll; and
opening the contact seal plate device.

6. A hot-dip-plated steel-strip produced using the steel-strip production method according to claim 2.

7. A hot-dip-plated steel-strip produced using the steel-strip production method according to claim 3.

8. A hot-dip-plated steel-strip produced using the steel-strip production method according to claim 5.

9. A cold-rolled steel strip produced using the steel-strip production method according to claim 1.

10. A cold-rolled steel strip produced using the steel-strip production method according to claim 2.

11. A cold-rolled steel strip produced using the steel-strip production method according to claim 3.

12. A cold-rolled steel strip produced using the steel-strip production method according to claim 5.

13. The steel-strip production method according to claim 1, wherein the noncontact seal roll device includes a first seal roll device and a second seal roll device which are arranged in two stages along the transfer direction of the base steel strip.

14. The steel-strip production method according to claim 13, wherein the first seal roll device includes a first pair of seal rolls, the second seal roll device includes a second pair of seal rolls, a distance between the first pair of seal rolls is controlled by a first opening/closing device, and a distance between the second pair of seal rolls is controlled by a second opening/closing device.

15. A steel-strip production method for producing a hot-dip-plated steel strip and a cold-rolled steel strip, the method comprising:

providing a steel-strip production apparatus configured to produce a hot-dip-plated steel strip and a cold-rolled steel strip from a base steel strip, the steel-strip production apparatus including a continuous annealing furnace, a snout connected to the continuous annealing furnace, a contact seal plate device and a noncontact seal roll device that are arranged on an entry side of the snout along a transfer direction of the base steel strip in this order, a removable hot-dip-plated steel strip device configured to produce the hot-dip-plated steel strip, and a removable cold-rolled steel strip device configured to produce the cold-rolled steel strip, the removable hot-dip-plated steel strip device including a hot-dip-plating tank, bath equipment disposed in the hot-dip-plating tank, and a sink roll that is configured to turn a path direction of the base steel strip after the base steel strip passes through the snout with the removable hot-dip-plated steel strip device in an online position, and the removable cold-rolled steel strip device including a deflector roll configured to turn the path direction of the base steel strip after the base steel strip passes through the snout with the removable cold-rolled steel strip device in an online position;

continuously annealing a first portion of the base steel strip to produce the hot-dip-plated steel strip by moving the removable cold-rolled steel strip device from the online position to an offline position where the removable cold-rolled steel strip device is completely removed from the steel-strip production apparatus, and operating the steel-strip production apparatus with the removable hot-dip-plated steel strip device in the online position; and continuously annealing a second portion of the base steel strip to produce the cold-rolled steel strip by moving the removable hot-dip-plated steel strip device from the online position to an offline position where the removable hot-dip-plated steel strip device is completely removed from the steel-strip production apparatus, and operating the steel-strip production apparatus with the removable cold-rolled steel strip device in the online position, wherein during continuously annealing the first portion of the base steel strip with the removable hot-dip-plated steel strip device in the online position, the hot-dip-plated steel strip is produced from the first portion of the base steel strip by bringing the first portion of the base steel strip that is continuously annealed in the continuous annealing furnace into the hot-dip-plating tank, during continuously annealing the second portion of the base steel strip with the removable cold-rolled steel strip device in the online position, the cold-rolled steel strip is produced from the second portion of the base steel strip by transferring the base steel strip that is continuously annealed in the continuous annealing furnace without causing the second portion of the base steel strip to pass through the hot-dip-plating tank, and a position of the sink roll in the removable hot-dip-plated steel strip device when in the online position is a position of the deflector roll in the removable cold-rolled steel strip device when in the online position.

* * * * *